(12) United States Patent
Iijima

(10) Patent No.: US 9,049,308 B2
(45) Date of Patent: Jun. 2, 2015

(54) COMMUNICATION TERMINAL DEVICE HAVING REGISTRATION DETERMINING UNIT

(75) Inventor: Osamu Iijima, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 587 days.

(21) Appl. No.: 12/943,318

(22) Filed: Nov. 10, 2010

(65) Prior Publication Data

US 2011/0110509 A1    May 12, 2011

(30) Foreign Application Priority Data

Nov. 12, 2009   (JP) ................. 2009-259021

(51) Int. Cl.
| | | |
|---|---|---|
| H04M 15/06 | (2006.01) | |
| H04M 1/2745 | (2006.01) | |
| H04N 1/32 | (2006.01) | |

(52) U.S. Cl.
CPC ........ *H04M 15/06* (2013.01); *H04M 1/274508* (2013.01); *H04M 1/274516* (2013.01); *H04N 1/32016* (2013.01); *H04N 1/32037* (2013.01); *H04N 2201/0094* (2013.01)

(58) Field of Classification Search
USPC .......... 379/142.02–142.18, 280, 355.02, 379/355.04
See application file for complete search history.

(56) References Cited

U.S. PATENT DOCUMENTS

| | | | |
|---|---|---|---|
| 2005/0168774 A1* | 8/2005 | Eguchi et al. ............... | 358/1.15 |
| 2007/0133543 A1* | 6/2007 | Kawasaki .................... | 370/392 |
| 2008/0024833 A1* | 1/2008 | Kawasaki .................... | 358/468 |

FOREIGN PATENT DOCUMENTS

| | | | |
|---|---|---|---|
| JP | 2003-078734 | | 3/2003 |
| JP | 2003-101634 | A | 4/2003 |
| JP | 2007-166152 | A | 6/2007 |
| JP | 2008-113428 | A | 5/2008 |
| JP | 2008-252762 | A | 10/2008 |

* cited by examiner

*Primary Examiner* — Yosef K Laekemariam
(74) *Attorney, Agent, or Firm* — Kubotera & Associates, LLC

(57) ABSTRACT

A communication terminal device is capable of communicating with an external terminal device and an external information supplying device. The communication terminal device includes a receiving unit for receiving origination information from the external terminal device; a registration information storage unit for storing a destination of information transmission to the external terminal device as destination information; a searching unit for determining whether information for identifying the origination information exists in information in the external information supplying device; a destination information analyzing unit for retrieving retrieved information as the information for identifying the origination information from the information in the external information supplying device according to a determination result of the searching unit; and a destination registration unit for storing the retrieved information in the registration information storage unit according to the determination result of the searching unit.

14 Claims, 12 Drawing Sheets

| | 301 | 302 | 303 | 304 |
|---|---|---|---|---|
| | No. | Name | Telephone number | Address |
| | 001 | AA Corporation | 000-123-0123 | Virginia |
| | 002 | BB Corp. | 000-123-0124 | Washington, D.C. |
| | 003 | CC Corp. | 000-123-0125 | Maryland |

300

000-124-0123 — 510
511

| Telephone number | Name | Address |
|---|---|---|
| 000-123-0124 | BB Corp. | Washington, D.C. |
| 000-123-0126 | DD LLC | Maryland |
| 000-123-0123 | AA Corporation | Virginia |
| 000-124-0123 | EE Club Supply Department | Virginia |
| 000-123-0125 | CC Corp. | Maryland |

Receive fax from the following origination.

Name: EE Club Supply Department
Telephone Number: 000-124-0123
Address: Virginia

900

| No. | Name | Telephone number | Address |
|---|---|---|---|
| 001 | EE Club Supply Department | 000-124-0123 | Virginia |

| No. | Name | Telephone number | Address |
|---|---|---|---|
| 001 | AA Corporation | 000-123-0123 | Virginia |
| 002 | BB Corp. | 000-123-0124 | Washington, D.C. |
| 003 | CC Corp. | 000-123-0125 | Maryland |
| 004 | EE Club Supply Department | 000-124-0123 | Virginia |

| Telephone number (X-1) | Name (X-2) | Address (X-3) |
|---|---|---|
| 000-123-0126 | DD LLC | Maryland |

FIG. 20

COMMUNICATION TERMINAL DEVICE HAVING REGISTRATION DETERMINING UNIT

BACKGROUND OF THE INVENTION AND RELATED ART STATEMENT

The present invention relates to a communication terminal device.

A conventional communication terminal device is configured to notify a user of origination information used by an originator of information when the user is called before the user responds. When the convention communication terminal device receives the origination information, the convention communication terminal device registers the origination information and information related to the origination information as destination information, thereby making it possible to use the convention communication terminal device without forcing the user to perform a cumbersome setting operation. (Refer to Patent Reference) Patent Reference: Japanese Patent Publication No. 2003-078734

As described above, the convention communication terminal device registers the origination information and the information related to the origination information as the destination information without distinguishing the origination information. The convention communication terminal device is provided with a storage device for storing the destination information. Accordingly, when the storage device reaches a maximum capacity, it is necessary to delete unnecessary destination information among the destination information already registered to secure a storage area for the registration, so that the destination information is additionally registered. In this case, the user needs to perform a cumbersome operation to delete the unnecessary destination information.

In view of the problems described above, an object of the present invention is to provide a communication terminal device capable of solving the problems of the conventional communication terminal device. In the present invention, origination information is efficiently registered as destination information. Accordingly, it is possible to efficiently utilize a storage area of a storage device in the communication terminal device.

Further objects and advantages of the invention will be apparent from the following description of the invention.

SUMMARY OF THE INVENTION

In order to attain the objects described above, according to a first aspect of the present invention, a communication terminal device is capable of communicating with an external terminal device and an external information supplying device. The communication terminal device includes a receiving unit for receiving origination information from the external terminal device; a registration information storage unit for storing a destination of information transmission to the external terminal device as destination information; and a searching unit for determining whether information for identifying the origination information exists in information in the external information supplying device.

According to the first aspect of the present invention, the communication terminal device further includes a destination information analyzing unit for retrieving retrieved information as the information for identifying the origination information from the information in the external information supplying device according to a determination result of the searching unit; and a destination registration unit for storing the retrieved information in the registration information storage unit according to the determination result of the searching unit.

According to a second aspect of the present invention, a communication terminal device includes a receiving unit for receiving origination information; a registration information storage unit for storing a destination as destination information; a registration information analyzing unit for determining whether the origination information received with the receiving unit exists in the registration information storage unit; a searching unit for determining whether the destination information is stored in a storage unit provided in an external terminal device according to the origination information received with the receiving unit; and a registration unit for storing the destination information searched with the searching unit in the registration information storage unit. When the registration information analyzing unit determines that the destination information is not stored in the registration information storage unit, the registration unit stores the destination information in the registration information storage unit.

In the present invention, only an origination telephone number from an originator satisfying a preset registration condition is registered as the destination information. Accordingly, it is possible to efficiently utilize a storage area of the storage unit in the communication terminal device.

BRIEF DESCRIPTION OF THE DRAWINGS

FIG. 18 is a schematic view showing the origination information of the communication terminal device according to the third embodiment of the present invention;

FIG. 19 is a schematic view showing the destination information of the communication terminal device according to the third embodiment of the present invention; and FIG. 20 is a schematic view showing retrieved information of the communication terminal device according to the first embodiment of the present invention.

DETAILED DESCRIPTION OF PREFERRED EMBODIMENTS

Hereunder, embodiments of the present invention will be explained with reference to the accompanying drawings. The present invention is not limited to the following description, and may be modified within a scope of the present invention.

First Embodiment

Figure 1:
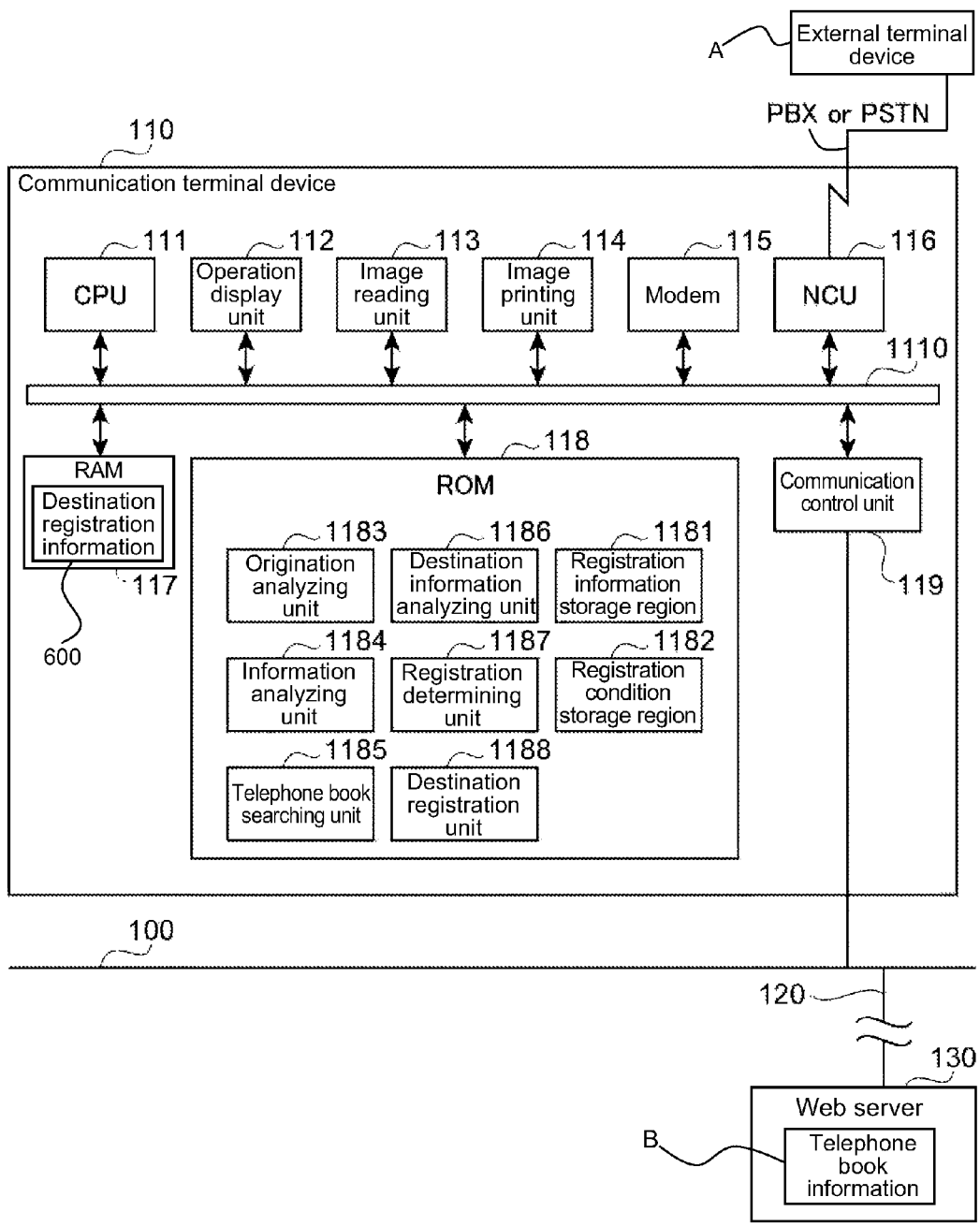
FIG. 1 is a block diagram showing a communication system according to a first embodiment of the present invention.

A first embodiment of the present invention will be explained. FIG. 1 is a block diagram showing a communication system, mainly a communication terminal device 110, according to the first embodiment of the present invention.

As shown in FIG. 1, in the communication system, the communication terminal device 110 is connected to an external terminal device A through PBX (Private Branch eXchange) or PSTN (Public Switched Telephone Network), and to a Web server 130 through a network 100 and a network 120. In the communication system, the communication terminal device 110 is capable of receiving communication data transmitted from the external terminal device A such as a facsimile, and is capable of receiving and transmitting data with the Web server 130 as an external information supplying device.

A configuration of the communication terminal device 110 will be explained in more detail. As shown in FIG. 1, the communication terminal device 110 includes a CPU (Central Processing Unit) 111; an operation display unit 112; an image reading unit 113; an image printing unit 114; a modem 115; an NCU (Network Control Unit) 116; an RAM (Random Access Memory) 117; an ROM (Read Only Memory) 118; a communication control unit 119; and a system bus 1110.

In the embodiment, the CPU 111 is a central calculation processing unit, and is formed of a micro processor and the like. The CPU 110 controls a program stored in a device connected thereto through the system bus 1110 or the ROM 118, thereby controlling an entire operation of the communication terminal device 110.

In the embodiment, the operation display unit 112 includes an information input unit formed of a touch panel and the like (not shown), and an information display unit formed of a liquid crystal display and the like (not shown). The operation display unit 112 is provided for receiving information input by a user through the information input unit, and for displaying an operational status of the communication terminal device 110 or various types of information on the information display unit.

In the embodiment, the image reading unit 113 includes an imaging element such as a CCD (Charge Coupled Device) for reading an image on an original set by a user, and for creating image data according to an image thus read.

In the embodiment, the image printing unit 114 includes a print engine of an electro-photography type (not shown) for printing an image on a recording medium according to the image data created with the image reading unit 113 or image data input from an external device.

In the embodiment, the modem 115 is a modulator-demodulator for modulating or demodulating a binary code or image data created with a facsimile transmission control unit, so that the modem 115 exchanges transmission data with respect to a facsimile as the external terminal device.

In the embodiment, the NCU 116 as a receiving unit is a network control unit for controlling connection and disconnection between the modem 115 and the PBX or the PSTN.

In the embodiment, the RAM 117 is a storage unit of a volatile type for temporarily storing information necessary for the CPU 111 to execute a program and the image data created with the image reading unit 113. The ROM 118 is a storage unit of a non-volatile type for storing a program executed with the CPU 111.

In the embodiment, the communication control unit 119 is provided for controlling data transmission in both directions through the network 100. The system bus 1110 is an electrical signal line for connecting the CPU 111 to the components described above.

A storage region to be created in the ROM 118 and a program to be stored therein will be explained next. As shown in FIG. 1, the ROM 118 includes a registration information storage region 1181; a registration condition storage region 1182; an origination analyzing unit 1183; a registration information analyzing unit 1184; a telephone book searching unit 1185; a destination information analyzing unit 1186; a registration determining unit 1187; and a destination registration unit 1188.

Figure 2:
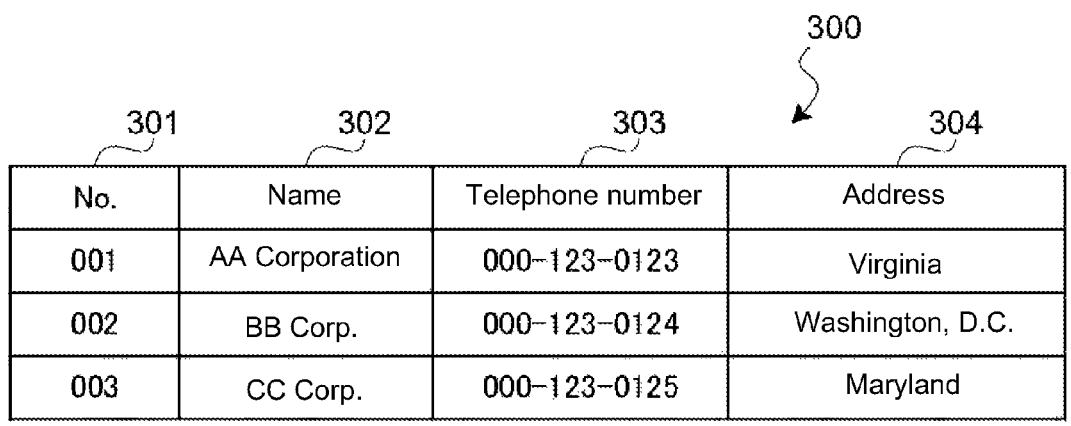
FIG. 2 is a schematic view showing destination information of a communication terminal device according to the first embodiment of the present invention.

In the embodiment, the registration information storage region 1181 is a storage region for storing destination information 300 retained in the communication terminal device 110. FIG. 2 is a schematic view showing the destination information 300 of the communication terminal device 110 according to the first embodiment of the present invention. As shown in FIG. 2, the destination information 300 as destination information includes four types of information such as a registration number 301, a name 302, a telephone number 303, and an address 304. The name 302, the telephone number 303, and the address 304 are correlated to the registration number 301 in a table format. It is configured such that the user can edit the destination information 300 through the operation display unit 112.

Figure 3:
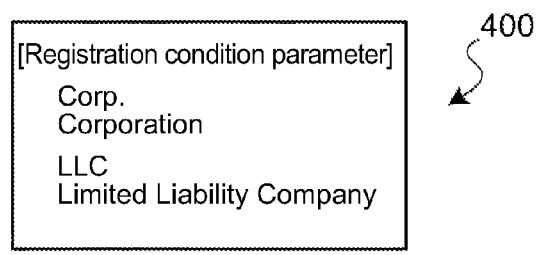
FIG. 3 is a schematic view showing registration condition information of the communication terminal device according to the first embodiment of the present invention.

In the embodiment, the registration condition storage region 1182 is a storage region for storing registration condition information 400 as a determination condition for determining whether the destination information 300 can be stored in the registration information storage region 1181. FIG. 3 is a schematic view showing the registration condition information 400 of the communication terminal device 110 according to the first embodiment of the present invention.

As shown in FIG. 3, the registration condition information 400 includes a registration condition parameter as the determination condition. More specifically, the registration determining unit 1187 is arranged to refer to the registration condition parameter, so that it is possible to determine that contents of the destination information 300 can be stored in the registration information storage region 1181 as the destination information when one of keywords of "Corp.", "Corporation", "LLC", and "Limited Liability Company" is contained in a name of the destination registration information retrieved with the destination information analyzing unit 1186 (described later). It is configured such that the user can edit the registration condition information 400 through the operation display unit 112.

Figure 4:
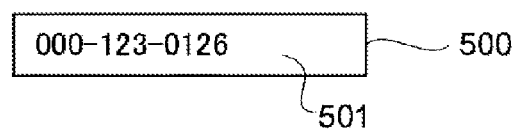
FIG. 4 is a schematic view showing origination information of the communication terminal device according to the first embodiment of the present invention.

In the embodiment, the origination analyzing unit 1183 is a program for analyzing and obtaining an origination telephone number 501 from origination information 500 received with the communication terminal device 110 through the NCU 116. FIG. 4 is a schematic view showing the origination information 500 of the communication terminal device 110 according to the first embodiment of the present invention.

As shown in FIG. 4, the origination information 500 includes the origination telephone number 501, i.e., a number of an originator on a telephone network. More specifically, the origination analyzing unit 1183 is provided for analyzing the origination information 500 thus received to obtain the origination telephone number 501.

In the embodiment, the registration information analyzing unit 1184 is a program for referring to the destination information 300 stored in the registration information storage region 1181 according to the origination telephone number 501 obtained with the origination analyzing unit 1183, so that the registration information analyzing unit 1184 determines whether the destination information corresponding to the origination telephone number 501 is already stored in the registration information storage region 1181.

In the embodiment, the telephone book searching unit 1185 is a program as a searching unit for referring to telephone book information as information in the external information supplying device disclosed and provided publicly with the Web server 130 according to the origination telephone number 501 obtained with the origination analyzing unit 1183, so that the telephone book searching unit 1185 determines whether a telephone number corresponding to the origination telephone number 501 exists in the telephone book information.

In the embodiment, the destination information analyzing unit 1186 is a program for retrieving retrieved information X (refer to FIG. 20) from destination registration information 600 as retrieved information necessary to be added as the destination information 300 retained in the communication terminal device 110 when a telephone number corresponding to the origination telephone number 501 exists in the telephone book information.

Figure 5:
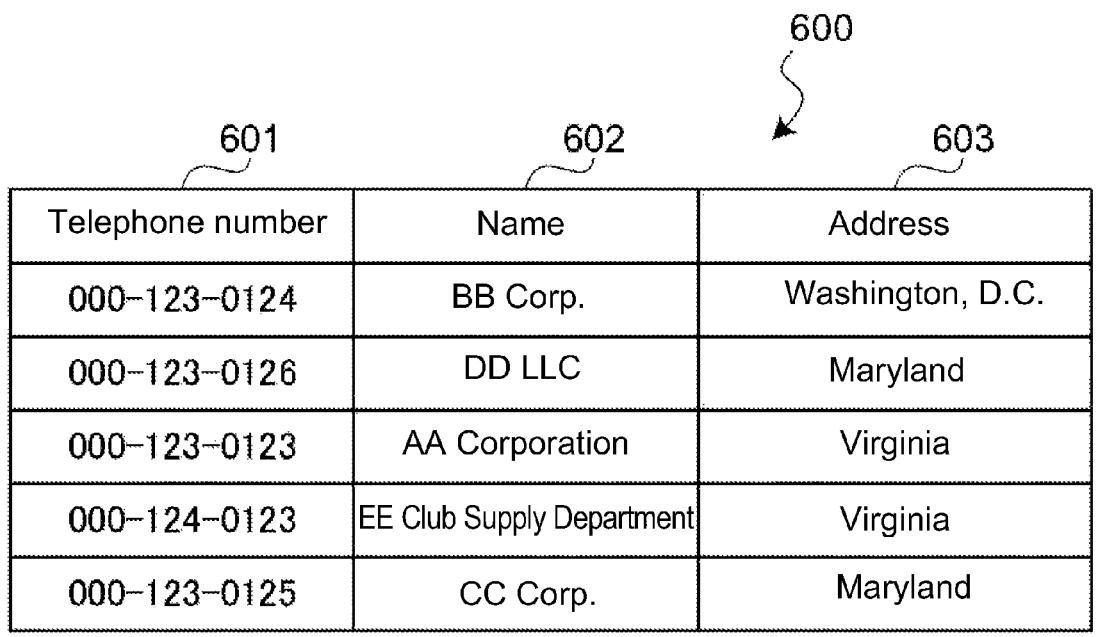
FIG. 5 is a schematic view showing destination registration information of the communication terminal device according to the first embodiment of the present invention.

FIG. 5 is a schematic view showing the destination registration information 600 of the communication terminal device 110 according to the first embodiment of the present invention. As shown in FIG. 5, the destination registration information 600 includes three types of information such as a telephone number 601, a name 602, and an address 603. The name 602 and the address 603 are correlated to the telephone number 601 in a table format. It is noted that the destination registration information 600 is similar to telephone book information B (refer to FIG. 1).

In the embodiment, the registration determining unit 1187 is a program for referring to the registration condition parameter of the registration condition information 400 stored in the registration condition storage region 1182 with respect to the destination registration information 600 retrieved with the destination information analyzing unit 1186, so that the registration determining unit 1187 determines whether it is possible to store contents of the destination registration information 600 in the registration information storage region 1181 as the destination information.

In the embodiment, the destination registration unit 1188 is a program for storing information related to the destination information of the destination registration information 600 in the registration information storage region 1181 according to a determination result of the registration determining unit 1187.

In the communication terminal device 110 with the configuration described above, it is possible to register only an origination telephone number from an originator satisfying the preset registration condition as the destination information. Accordingly, it is possible to efficiently utilize a storage area of the storage unit in the communication terminal device 110.

A configuration of the network 120 and the Web server 130 will be explained next. In the embodiment, the network 120 is a normal internet network, and is connected to the network 100 through a security system such as firewall. The Web server 130 is connected to the communication terminal device 110 through the network 120, and provides a search and reference service of telephone number registration information as the telephone book information through an internet network.

Figure 6:
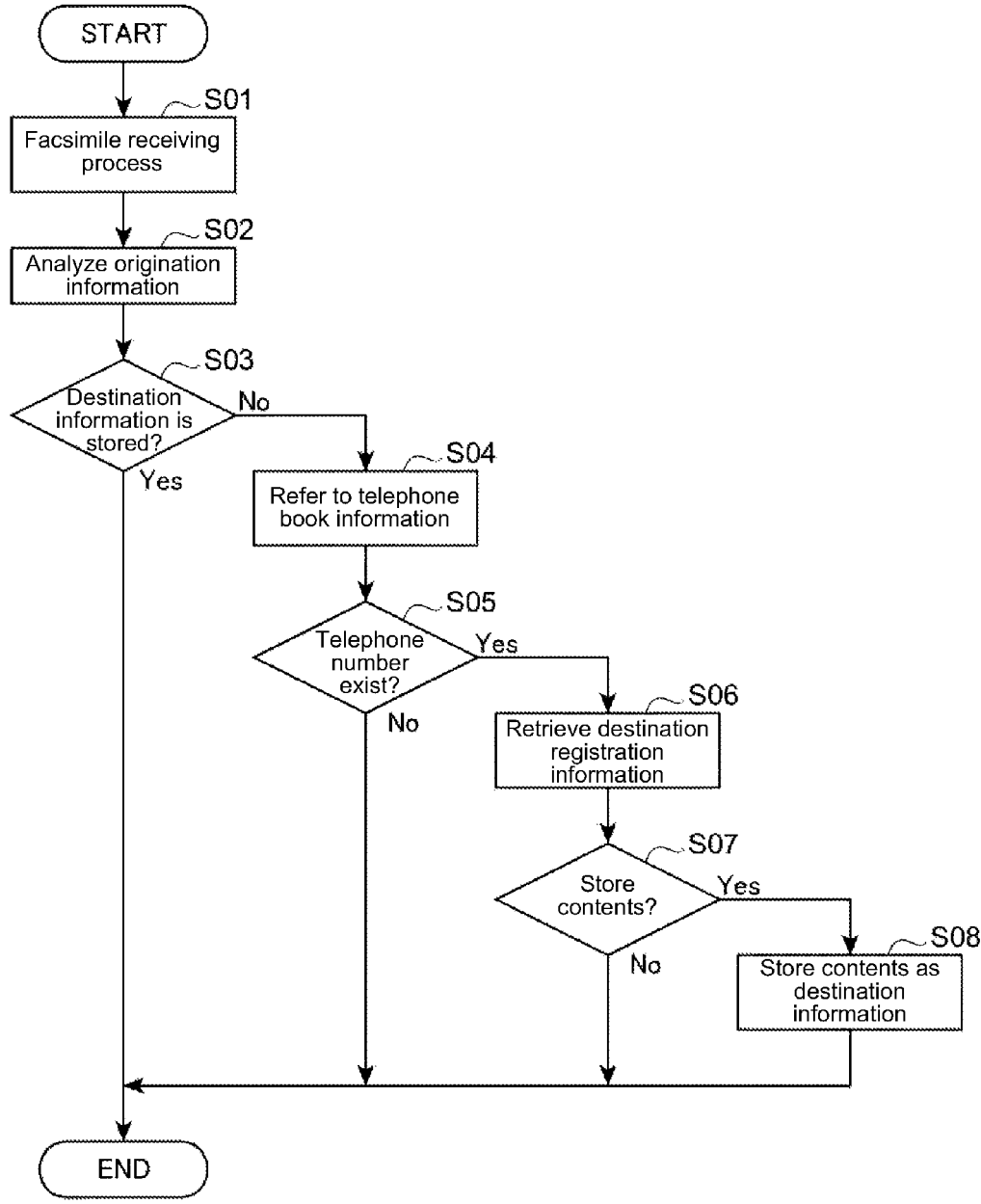
FIG. 6 is a flow chart showing an operation of the communication terminal device according to the first embodiment of the present invention.

An operation of the communication terminal device 110 will be explained next. FIG. 6 is a flow chart showing the operation of the communication terminal device 110 according to the first embodiment of the present invention. In the following description, it is supposed that the registration information storage region 1181 of the communication terminal device 110 stores the destination information 300 shown in FIG. 2, and the registration condition storage region 1182 of the communication terminal device 110 stores the registration condition information 400 shown in FIG. 3.

In step S01, in a facsimile receiving process, the communication terminal device 110 receives facsimile data through the NCU 116. At this time, the communication terminal device 110 also receives the origination information 500 shown in FIG. 4.

In step S02, when the communication terminal device 110 receives the origination information 500, the origination analyzing unit 1183 analyzes the origination information 500 thus received to obtain the origination telephone number 501, and temporarily stores the origination telephone number 501 in the RAM 117. Then, the origination analyzing unit 1183 notifies the registration information analyzing unit 1184 that the origination analyzing unit 1183 obtains the origination telephone number 501.

In step S03, when the registration information analyzing unit 1184 receives the notification from the origination analyzing unit 1183, the registration information analyzing unit 1184 retrieves the origination telephone number 501 from the RAM 117. Then, the registration information analyzing unit 1184 refers to the destination information 300 stored in the registration information storage region 1181 according to the origination telephone number 501 thud obtained, so that the registration information analyzing unit 1184 determines whether the destination information corresponding to the origination telephone number 501 is already stored in the registration information storage region 1181.

When the registration information analyzing unit 1184 determines that the destination information corresponding to the origination telephone number 501 is already stored in the registration information storage region 1181 (step S03, Yes), the CPU 111 completes a series of processes. When the registration information analyzing unit 1184 determines that the destination information corresponding to the origination telephone number 501 is not stored in the registration information storage region 1181 (step S03, No), the registration information analyzing unit 1184 notifies the telephone book searching unit 1185 that the destination information corresponding to the origination telephone number 501 is not stored in the registration information storage region 1181.

When the telephone book searching unit 1185 receives the notification from the registration information analyzing unit 1184, the telephone book searching unit 1185 instructs the communication control unit 119 to obtain the telephone book information B disclosed and provided publicly with the Web server 130. Upon receiving the instruction, the communication control unit 119 is connected to the Web server 130 through the network 100 and the network 120, so that the communication control unit 119 obtains the telephone book information, and temporarily stores the telephone book information in the RAM 117 as the destination registration information 600.

In step S04, the telephone book searching unit 1185 refers to the telephone book information retrieved from the RAM 117 according to the origination telephone number 501. In step S05, the telephone book searching unit 1185 determines whether a telephone number corresponding to the origination telephone number 501 exists in the telephone book information.

When the telephone book searching unit 1185 determines that the telephone number corresponding to the origination telephone number 501 does not exist in the telephone book information (step S05, No), the CPU 111 completes a series of processes. When the telephone book searching unit 1185 determines that the telephone number corresponding to the origination telephone number 501 exists in the telephone book information (step S05, Yes), the telephone book searching unit 1185 notifies the destination information analyzing unit 1186 that the telephone number corresponding to the origination telephone number 501 exists in the telephone book information.

FIG. 20 is a schematic view showing the retrieved information X of the communication terminal device 110 according to the first embodiment of the present invention.

As shown in FIG. 20, the retrieved information X includes a telephone number X-1, a name X-2, and an address X-3.

In step S06, when the destination information analyzing unit 1186 receives the notification from the telephone book searching unit 1185, the destination information analyzing unit 1186 retrieves the retrieved information X shown in FIG. 20 corresponding to the telephone number corresponding to the origination telephone number 501 from the destination registration information 600 shown in FIG. 5. Then, the destination information analyzing unit 1186 temporarily stores the retrieved information X thus retrieved from the destination registration information 600 in the RAM 117. Afterward, the destination information analyzing unit 1186 notifies the registration determining unit 1187 that the destination information analyzing unit 1186 retrieves the retrieved information X from the destination registration information 600.

In step S07, when the registration determining unit 1187 receives the notification from the destination information analyzing unit 1186, the registration determining unit 1187 obtains the retrieved information X from the RAM 117. Then, the registration determining unit 1187 refers to the registration condition parameter of the registration condition information 400 stored in the registration condition storage region 1182 with respect to the retrieved information X thus retrieved, so that the registration determining unit 1187 determines whether it is possible to store the contents of the retrieved information X in the registration information storage region 1181 as the destination information.

When the registration determining unit 1187 determines that it is not possible to store the contents of the retrieved information X in the registration information storage region 1181 as the destination information (step S07, No), the CPU 111 completes a series of processes. More specifically, when any one of the keywords of "Corp.", "Corporation", "LLC", and "Limited Liability Company" is not contained in the name X-2 of the retrieved information X, the CPU 111 completes a series of processes. When the registration determining unit 1187 determines that it is possible to store the contents of the retrieved information X in the registration information storage region 1181 as the destination information (step S07, Yes), the registration determining unit 1187 notifies the destination registration unit 1188 that it is possible to store the contents of the destination registration information 600 in the registration information storage region 1181. More specifically, when at least one of the keywords of "Corp.", "Corporation", "LLC", and "Limited Liability Company" is contained in the name X-2 of the retrieved information X, the registration determining unit 1187 notifies the destination registration unit 1188 that it is possible to store the contents of the retrieved information X in the registration information storage region 1181.

Figure 7:
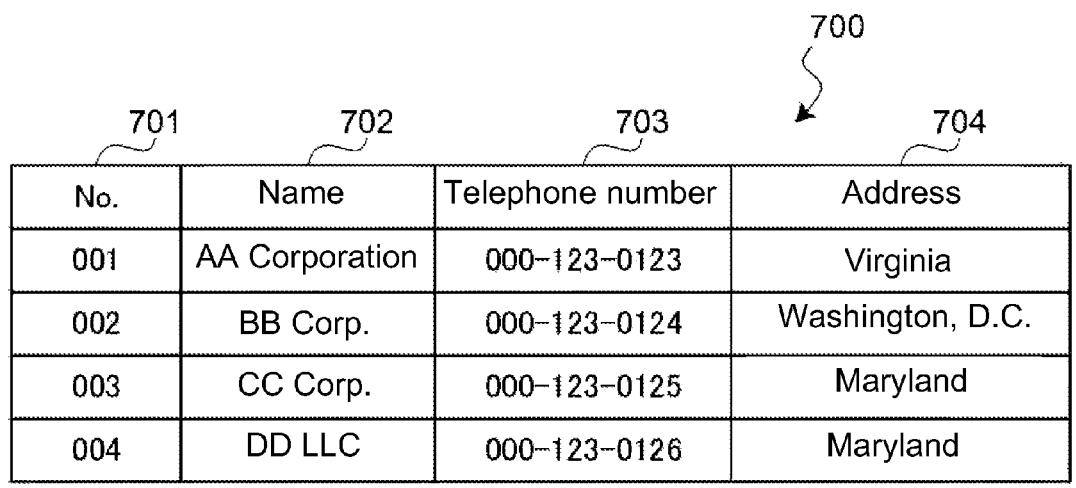
FIG. 7 is a schematic view showing the destination information of the communication terminal device according to the first embodiment of the present invention.

In step S08, when the destination registration unit 1188 receives the notification from the registration determining unit 1187, the destination registration unit 1188 stores the contents of the destination registration information 600 in the registration information storage region 1181 as the destination information 300 as shown in FIG. 7. Then, the CPU 111 completes a series of processes. Through the steps described above, the retrieved information X is added to the destination information 300 shown in FIG. 2, so that the destination information 300 is updated as shown in FIG. 7.

As described above, in the embodiment, when the communication terminal device 110 receives the facsimile data from the external terminal device, the communication terminal device 110 automatically identifies the destination according to the origination information, and stores the origination information. Accordingly, only the destination information of the external terminal device of the originator satisfying the preset registration condition is registered. Accordingly, it is possible to efficiently utilize a storage area of the storage unit in the communication terminal device 110.

Further, in the embodiment, the telephone book searching unit 1185 is provided as the searching unit for retrieving the retrieved information according to the telephone book information. The present invention is not limited thereto, and the telephone book searching unit 1185 may be provided for retrieving the retrieved information according to information such as a mail address, an address and the like.

Second Embodiment

A second embodiment of the present invention will be explained next. In the second embodiment, a communication terminal device 110' includes a storage unit for storing the origination information (the telephone number or the electric mail address) and the destination information (the name, the address, and the like) related to the origination information. Further, the communication terminal device 110' searches the storage unit according to the origination information. When the destination information related to the origination information does not exist in the storage unit, the communication terminal device 110' searches the information related to the origination information from a telephone book service provided from the external terminal device such as the Web server 130. When the information related to the origination information exists, the communication terminal device 110' obtains and stores the information in the storage unit.

In the second embodiment, a communication system has a configuration similar to that of the communication system in the first embodiment. Components in the second embodiment similar to those in the first embodiment are designated with the same reference numerals, and explanations thereof are omitted. Only different components from those in the first embodiment will be explained.

Figure 8:
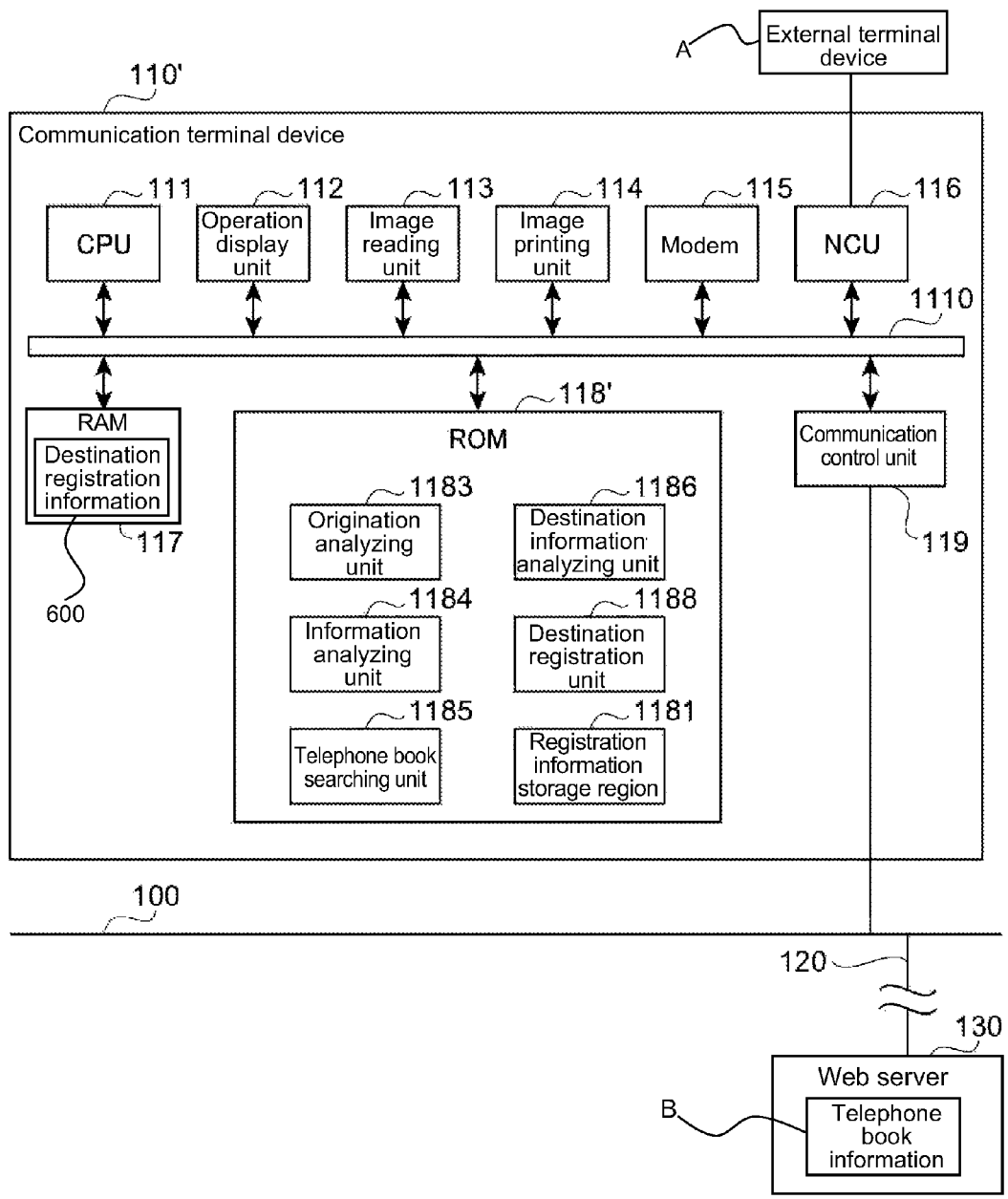
FIG. 8 is a block diagram showing a communication system according to a second embodiment of the present invention.

FIG. 8 is a block diagram showing the communication system, mainly the communication terminal device 110', according to the second embodiment of the present invention.

As shown in FIG. 8, the communication terminal device 110' includes an ROM (Read Only Memory) 118' instead of the ROM 118 of the communication terminal device 110. The ROM 118' includes the registration information storage region 1181; the origination analyzing unit 1183; the registration information analyzing unit 1184; the telephone book searching unit 1185; the destination information analyzing unit 1186; and the destination registration unit 1188. A storage region to be created in the ROM 118' and a program to be stored therein are similar to those in the first embodiment, and explanations thereof are omitted.

Figure 9:
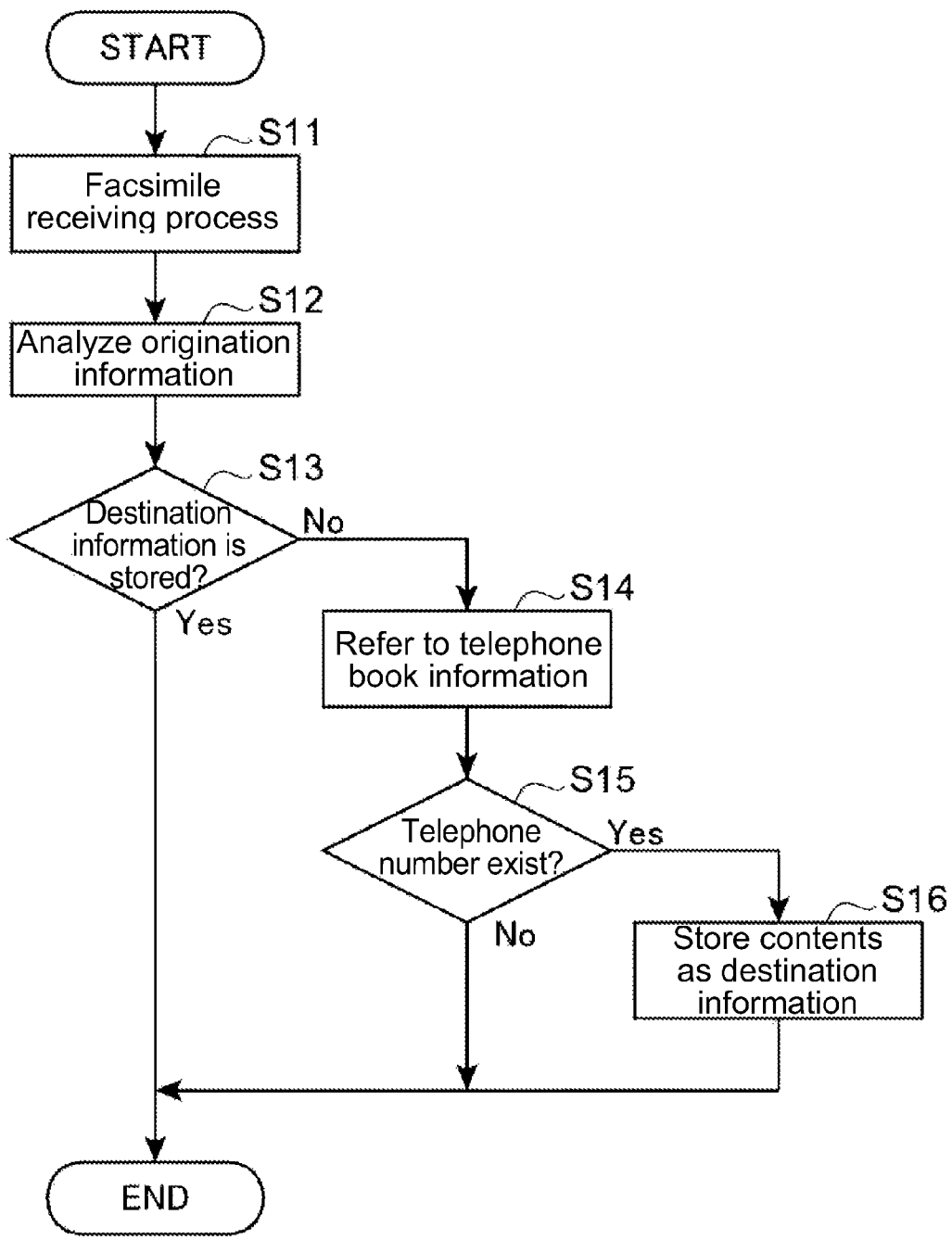
FIG. 9 is a flow chart showing an operation of a communication terminal device according to the second embodiment of the present invention.

An operation of the communication terminal device 110' will be explained with reference to FIG. 9. FIG. 9 is a flow chart showing the operation of the communication terminal device 110' according to the second embodiment of the present invention. In the following description, it is supposed that the registration information storage region 1181 of the communication terminal device 110' stores the destination information 300 shown in FIG. 2.

In step S11, in the facsimile receiving process, the communication terminal device 110' receives facsimile data through the NCU 116. At this time, the communication terminal device 110' also receives the origination information 500 shown in FIG. 4.

In step S12, when the communication terminal device 110 receives the origination information 500, the origination analyzing unit 1183 analyzes the origination information 500 thus received to obtain the origination telephone number 501, and temporarily stores the origination telephone number 501 in the RAM 117. Then, the origination analyzing unit 1183 notifies the registration information analyzing unit 1184 that the origination analyzing unit 1183 obtains the origination telephone number 501.

In step S13, when the registration information analyzing unit 1184 receives the notification from the origination analyzing unit 1183, the registration information analyzing unit 1184 retrieves the origination telephone number 501 from the RAM 117. Then, the registration information analyzing unit 1184 refers to the destination information 300 stored in the registration information storage region 1181 according to the origination telephone number 501 thud obtained, so that the registration information analyzing unit 1184 determines whether the destination information corresponding to the origination telephone number 501 is already stored in the registration information storage region 1181.

When the registration information analyzing unit 1184 determines that the destination information corresponding to the origination telephone number 501 is already stored in the registration information storage region 1181 (step S13, Yes), the CPU 111 completes a series of processes. When the registration information analyzing unit 1184 determines that the destination information corresponding to the origination telephone number 501 is not stored in the registration information storage region 1181 (step S13, No), the registration information analyzing unit 1184 notifies the telephone book searching unit 1185 that the destination information corresponding to the origination telephone number 501 is not stored in the registration information storage region 1181.

When the telephone book searching unit 1185 receives the notification from the registration information analyzing unit 1184, the telephone book searching unit 1185 instructs the communication control unit 119 to obtain the telephone book information disclosed and provided publicly with the Web server 130. Upon receiving the instruction, the communication control unit 119 is connected to the Web server 130 through the network 100 and the network 120, so that the communication control unit 119 obtains the telephone book information, and temporarily stores the telephone book information in the RAM 117.

In step S14, the telephone book searching unit 1185 refers to the telephone book information retrieved from the RAM 117 according to the origination telephone number 501. In step S15, the telephone book searching unit 1185 determines whether a telephone number corresponding to the origination telephone number 501 exists in the telephone book information.

When the telephone book searching unit 1185 determines that the telephone number corresponding to the origination telephone number 501 does not exist in the telephone book information (step S15, No), the CPU 111 completes a series of processes. When the telephone book searching unit 1185 determines that the telephone number corresponding to the origination telephone number 501 exists in the telephone book information (step S15, Yes), the telephone book searching unit 1185 notifies the destination information analyzing unit 1186 that the telephone number corresponding to the origination telephone number 501 exists in the telephone book information.

In the next step, when the destination information analyzing unit 1186 receives the notification from the telephone book searching unit 1185, the destination information analyzing unit 1186 retrieves the retrieved information X from the destination registration information 600 necessary as the destination information 300 retained in the communication terminal device 110' from the telephone book information corresponding to the telephone number corresponding to the origination telephone number 501. Then, the destination information analyzing unit 1186 temporarily stores the retrieved information thus retrieved from the destination registration information 600 in the RAM 117. Afterward, the destination information analyzing unit 1186 notifies the destination registration unit 1188 that the destination information analyzing unit 1186 retrieves the destination registration information 600.

In step S16, when the destination registration unit 1188 receives the notification from the destination information analyzing unit 1186, the destination registration unit 1188 stores the retrieved information X retrieved from the destination registration information 600 in the registration information storage region 1181 as the destination information 300. Then, the CPU 111 completes a series of processes.

Through the steps described above, the retrieved information X is added to the destination information 300 shown in FIG. 2, so that the destination information 300 is updated as shown in FIG. 7.

As described above, in the embodiment, the communication terminal device 110' searches the information related to the origination information from the telephone book service provided from the external terminal device such as the Web server 130. When the information related to the origination information does not exist, the communication terminal device 110' does not store the destination information in the storage unit. Accordingly, it is possible to efficiently utilize a storage area of the storage unit in the communication terminal device 110'.

In the embodiment, the telephone book information B of the Web server 130 is temporarily stored in the RAM 117 of the communication terminal device 110'. Then, the destination information analyzing unit 1186 retrieves the retrieved information X from the destination registration information 600. Alternatively, it may be configured such that the retrieved information is directly retrieved from the Web server 130.

Third Embodiment

A third embodiment of the present invention will be explained next. In the third embodiment, even when the destination information related to the origination information satisfying the condition to be stored in the communication terminal device does not exist according to the registration condition parameter of the registration condition information, it is configured such that the user can decide whether the destination information is stored in the storage unit of the communication terminal device.

Figure 10:
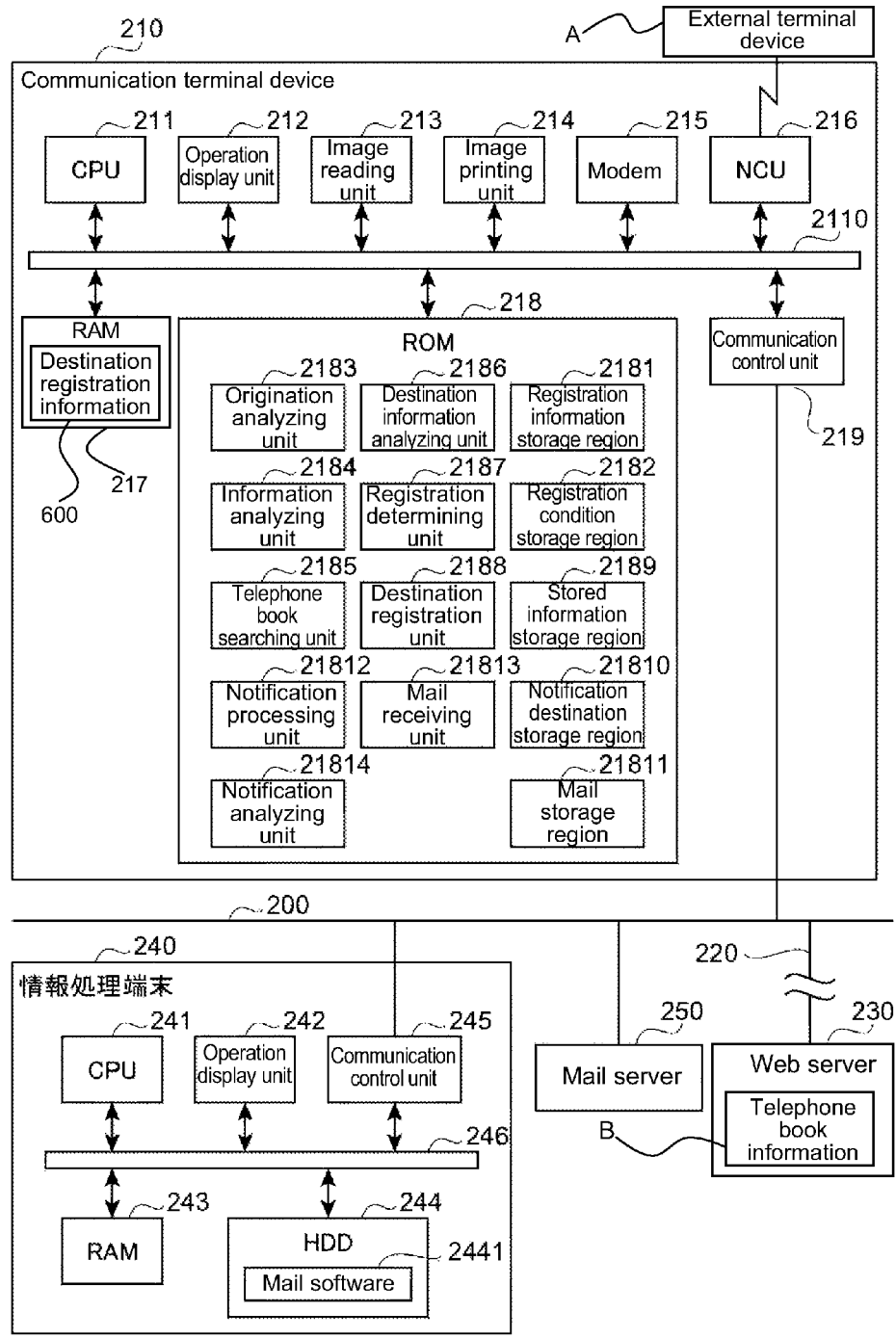
FIG. 10 is a block diagram showing a communication system according to a third embodiment of the present invention.

FIG. 10 is a block diagram showing a communication system, mainly a communication terminal device 210, according to the third embodiment of the present invention.

As shown in FIG. 10, in the communication system, the communication terminal device 210 is connected to an external terminal device (not shown) through PBX (Private Branch eXchange) or PSTN (Public Switched Telephone Network); an information processing terminal 240 or a mail server 250 through a network 200; and a Web server 230 through the network 200 and a network 220. In the communication system, the communication terminal device 210 is capable of receiving communication data transmitted from the external terminal device (not shown) such as a facsimile, and is capable of receiving and transmitting data with the Web server 230, the information processing terminal 240, or the mail server 250.

A configuration of the communication terminal device 210 will be explained in more detail. As shown in FIG. 10, the communication terminal device 210 includes a CPU (Central Processing Unit) 211; an operation display unit 212; an image reading unit 213; an image printing unit 214; a modem 215; an NCU (Network Control Unit) 216; an RAM (Random Access Memory) 217; an ROM (Read Only Memory) 218; a communication control unit 219; and a system bus 2110.

In the embodiment, the CPU 211 is a central calculation processing unit, and is formed of a micro processor and the like. The CPU 210 controls a program stored in a device connected thereto through the system bus 2110 or the ROM 218, thereby controlling an entire operation of the communication terminal device 210.

In the embodiment, the operation display unit 212 includes an information input unit formed of a touch panel and the like (not shown), and an information display unit formed of a liquid crystal display and the like (not shown). The operation display unit 212 is provided for receiving information input by a user through the information input unit, and for displaying an operational status of the communication terminal device 210 or various types of information on the information display unit.

In the embodiment, the image reading unit 213 includes an imaging element such as a CCD (Charge Coupled Device) for reading an image on an original set by a user, and for creating image data according to an image thus read.

In the embodiment, the image printing unit 214 includes a print engine of an electro-photography type (not shown) for printing an image on a recording medium according to the image data created with the image reading unit 213 or image data input from an external device.

In the embodiment, the modem 215 is a modulator-demodulator for modulating or demodulating a binary code or image data created with a facsimile transmission control unit, so that the modem 215 exchanges transmission data with respect to a facsimile as the external terminal device.

In the embodiment, the NCU 216 is a network control unit for controlling connection and disconnection between the modem 215 and the PBX or the PSTN.

In the embodiment, the RAM 217 is a storage unit of a volatile type for temporarily storing information necessary for the CPU 211 to execute a program and the image data created with the image reading unit 213. The ROM 218 is a storage unit of a non-volatile type for storing a program executed with the CPU 211.

In the embodiment, the communication control unit 219 is provided for controlling data transmission in both directions through the network 200. The system bus 2110 is an electrical signal line for connecting the CPU 211 to the components described above.

A storage region to be created in the ROM 218 and a program to be stored therein will be explained next. As shown in FIG. 10, the ROM 218 includes a registration information storage region 2181; a registration condition storage region 2182; an origination analyzing unit 2183; a registration information analyzing unit 2184; a telephone book searching unit 2185; a destination information analyzing unit 2186; a registration determining unit 2187; a destination registration unit 2188; a stored information storage region 2189; a notification destination storage region 21810; a mail storage region 21811; a notification processing unit 21812; a mail receiving unit 21813; and a notification analyzing unit 21814.

Figure 11:
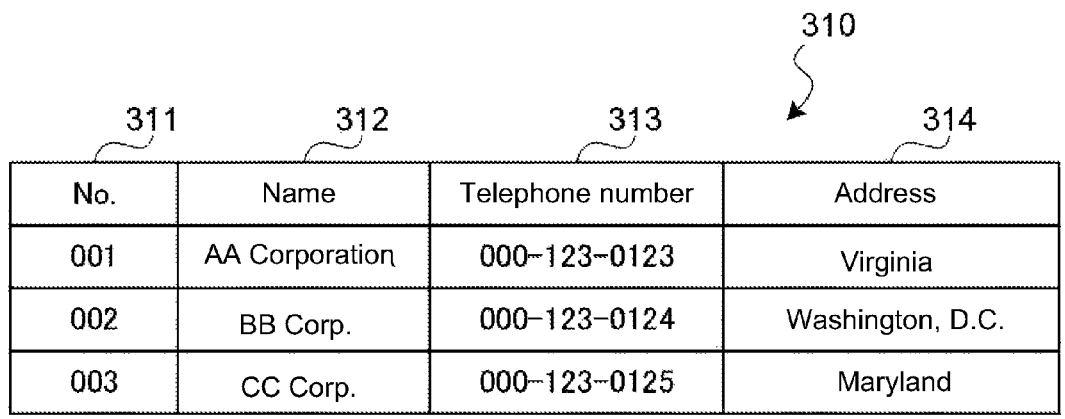
FIG. 11 is a schematic view showing destination information of a communication terminal device according to the third embodiment of the present invention.

In the embodiment, the registration information storage region 2181 is a storage region for storing destination information 310 retained in the communication terminal device 210. FIG. 11 is a schematic view showing the destination information 310 of the communication terminal device 210 according to the second embodiment of the present invention. As shown in FIG. 11, the destination information 310 includes four types of information such as a registration number 311, a name 312, a telephone number 313, and an address 314. The name 312, the telephone number 313, and the address 314 are correlated to the registration number 311 in a table format. It is configured such that the user can edit the destination information 310 through the operation display unit 212.

Figure 12:
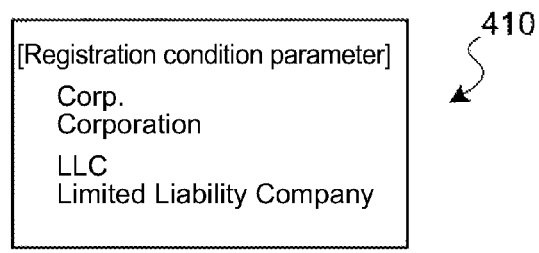
FIG. 12 is a schematic view showing registration condition information of the communication terminal device according to the third embodiment of the present invention.

In the embodiment, the registration condition storage region 2182 is a storage region for storing registration condition information 410 as a determination condition for determining whether the destination information 310 can be stored in the registration information storage region 2181. FIG. 12 is a schematic view showing the registration condition information 410 of the communication terminal device 210 according to the first embodiment of the present invention.

As shown in FIG. 12, the registration condition information 410 includes a registration condition parameter as the determination condition. More specifically, the registration determining unit 2187 is arranged to refer to the registration condition parameter, so that it is possible to determine that contents of the destination information 310 can be stored in the registration information storage region 2181 as the destination information when one of keywords of "Corp.", "Corporation", "LLC", and "Limited Liability Company" is contained in a name of the destination registration information retrieved with the destination information analyzing unit 2186 (described later). It is configured such that the user can edit the registration condition information 410 through the operation display unit 212.

In the embodiment, the stored information storage region 2189 is a storage region for temporarily storing contents of the destination registration information to be stored in the registration information storage region 2181.

Figure 13:
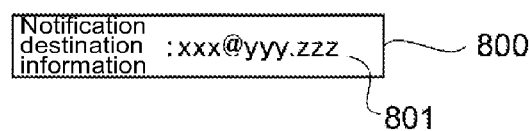
FIG. 13 is a schematic view showing notification destination information of the communication terminal device according to the third embodiment of the present invention.

In the embodiment, the notification destination storage region 21810 is a storage region for storing notification destination information 800 of a destination as a recipient of an electric mail. FIG. 13 is a schematic view showing the notification destination information 800 of the communication terminal device 210 according to the third embodiment of the present invention.

As shown in FIG. 13, the notification destination information 800 includes an electric mail address of a destination as a recipient thereof. It is configured such that the user can edit the notification destination information 800 through the operation display unit 212.

In the embodiment, the mail storage region 21811 is a storage region for storing electric mail data thus received.

Figures 14, 15, 16:
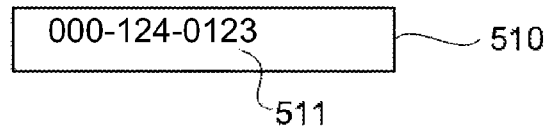
FIG. 14 is a schematic view showing origination information of the communication terminal device according to the third embodiment of the present invention.
FIG. 15 is a schematic view showing destination registration information of the communication terminal device according to the third embodiment of the present invention.
FIG. 16 is a schematic view showing main text contents of an electric mail of the communication terminal device according to the third embodiment of the present invention.

In the embodiment, the origination analyzing unit 2183 is a program for analyzing and obtaining an origination telephone number 511 from origination information 510 received with the communication terminal device 210 through the NCU 216. FIG. 14 is a schematic view showing the origination information 510 of the communication terminal device 210 according to the third embodiment of the present invention.

As shown in FIG. 14, the origination information 510 includes the origination telephone number 501, i.e., a number of an originator on a telephone network. More specifically, the origination analyzing unit 2183 is provided for analyzing the origination information 510 thus received to obtain the origination telephone number 511.

In the embodiment, the registration information analyzing unit 2184 is a program for referring to the destination information 310 stored in the registration information storage region 2181 according to the origination telephone number 511 obtained with the origination analyzing unit 2183, so that the registration information analyzing unit 2184 determines whether the destination information corresponding to the origination telephone number 511 is already stored in the registration information storage region 2181.

In the embodiment, the telephone book searching unit 2185 is a program for referring to telephone book information disclosed and provided publicly with the Web server 230 according to the origination telephone number 511 obtained with the origination analyzing unit 2183, so that the telephone book searching unit 2185 determines whether a telephone number corresponding to the origination telephone number 511 exists in the telephone book information.

In the embodiment, the destination information analyzing unit 2186 is a program for retrieving information corresponding to the origination telephone number 511 from destination registration information 610 necessary for updating the destination information 310 retained in the communication terminal device 210 when a telephone number corresponding to the origination telephone number 511 exists in the telephone book information.

FIG. 15 is a schematic view showing the destination registration information 610 of the communication terminal device 110 according to the third embodiment of the present invention. As shown in FIG. 15, the destination registration information 610 includes three types of information such as a telephone number 611, a name 612, and an address 613. The name 612 and the address 613 are correlated to the telephone number 611 in a table format.

In the embodiment, the registration determining unit 2187 is a program for referring to the registration condition parameter of the registration condition information 410 stored in the registration condition storage region 2182 with respect to the destination registration information 610 retrieved with the destination information analyzing unit 2186, so that the registration determining unit 2187 determines whether it is possible to store contents of the destination registration information 610 in the registration information storage region 2181 as the destination information.

In the embodiment, the destination registration unit 2188 is a program for storing information related to the destination information of the destination registration information 610 in the registration information storage region 2181 according to a determination result of the registration determining unit 2187.

In the embodiment, the notification processing unit 21812 is a program for transmitting an electric mail with the origination information as main text contents thereof through the communication control unit 219 according to an electric mail address 801 of the notification destination information 800. FIG. 16 is a schematic view showing the main text contents of the electric mail of the communication terminal device 210 according to the third embodiment of the present invention.

In the embodiment, the mail receiving unit 21813 is a program for obtaining the electric mail transmitted to the communication terminal device 210 from the mail server 250 through the communication control unit 219, and for storing the electric mail in the mail storage region 21811.

In the embodiment, the notification analyzing unit 21814 is a program for analyzing the electric mail stored in the mail storage region 21811, and for storing the destination information to which the origination telephone number 511 retrieved with the destination information analyzing unit 2186 is added in the registration information storage region 2181.

In the communication terminal device 210 with the configuration described above, it is possible for the user to arbitrarily store the destination information of the originator in the communication terminal device 210 even when the destination information of the originator does not match the registration condition.

A configuration of the network 220, the Web server 230, the information processing terminal 240, and the mail server 250 will be explained next. In the embodiment, the network 220 is a normal internet network, and is connected to the network 200 through a security system such as firewall. The Web server 230 is connected to the communication terminal device 210 through the network 220, and provides a search and reference service of telephone number registration information as the telephone book information through an internet network.

In the embodiment, the information processing terminal 240 is a personal computer (PC) connected to the network 200. As shown in FIG. 10, the information processing terminal 240 includes a CPU (Central Processing Unit) 241; an operation display unit 242; an RAM (Random Access Memory) 243; an HDD (Hard Disk Drive) 244; a communication control unit 245; and a system bus 246.

In the embodiment, the CPU 241 is a central calculation processing unit, and is formed of a micro processor and the like. The CPU 241 controls a program stored in a device connected thereto through the system bus 246 or the HDD 244, thereby controlling an entire operation of the information processing terminal 240.

In the embodiment, the operation display unit 242 includes an information input unit formed of a keyboard, a mouse, and the like (not shown), and an information display unit formed of a CRT (Cathode Ray Tube) and the like (not shown). The operation display unit 242 is provided for receiving information input by a user through the information input unit, and for displaying an operational status of the information processing terminal 240 or various types of information on the information display unit.

In the embodiment, the HDD 244 is a storage unit capable of electrically reading and writing data for storing a program for the CPU 241 to control the information processing terminal 240. Further, the HDD 244 includes a mail software 2441 provided with an electric mail reception transmission function.

In the embodiment, the communication control unit 245 is provided for controlling data transmission in both directions through the network 200. The system bus 246 is an electrical signal line for connecting the CPU 241 to the components described above.

In the embodiment, the mail server 250 is connected to the communication terminal device 210 through the network 200, and is provided with an electric mail reception transmission function.

Figure 17:
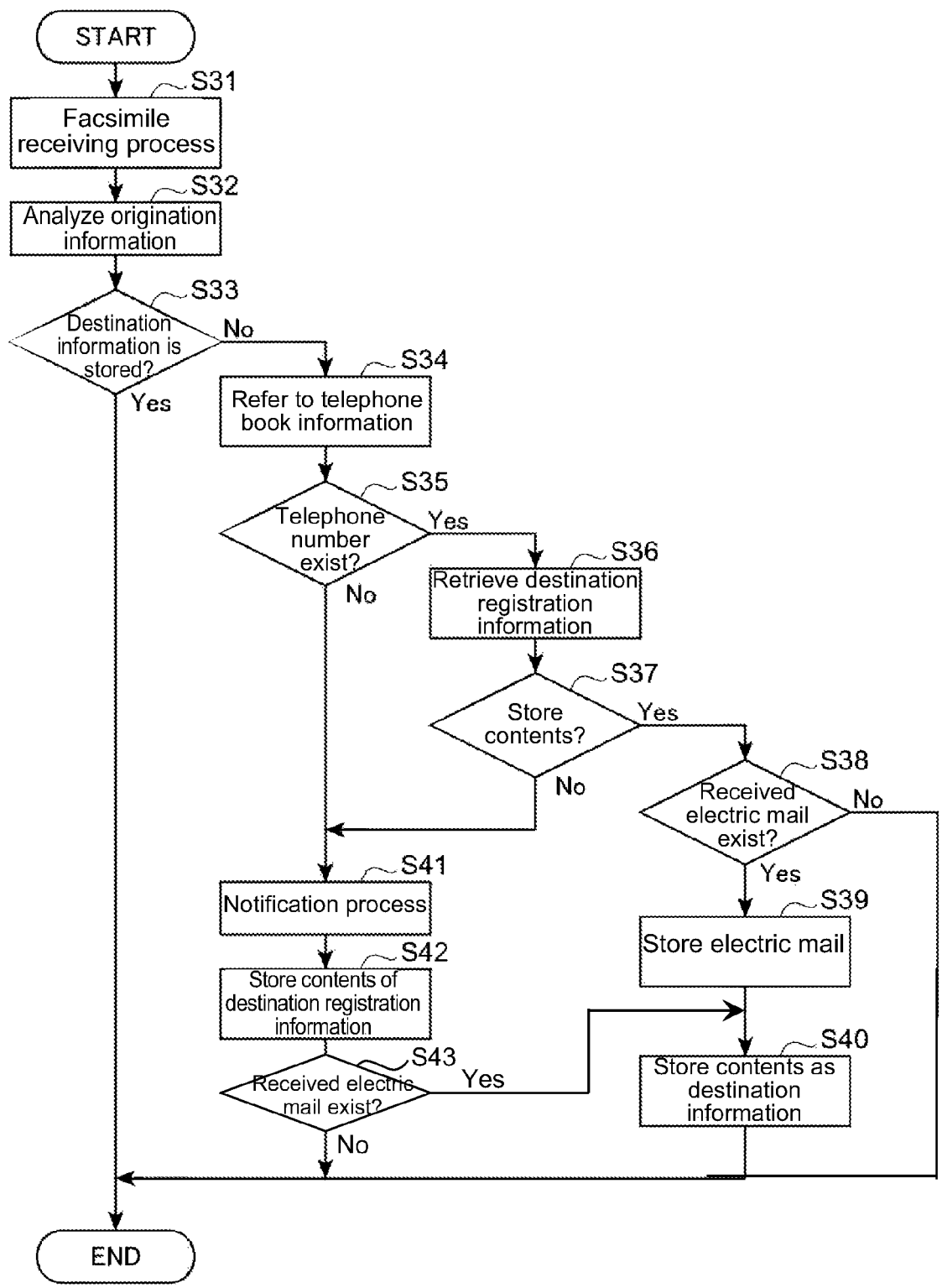
FIG. 17 is a flow chart showing an operation of the communication terminal device according to the third embodiment of the present invention.

An operation of the communication terminal device 210 will be explained next. FIG. 17 is a flow chart showing the operation of the communication terminal device 210 according to the third embodiment of the present invention. In the following description, it is supposed that the registration information storage region 2181 of the communication terminal device 210 stores the destination information 310 shown in FIG. 11, and the notification destination storage region 21810 of the communication terminal device 210 stores the electric mail address 801 shown in FIG. 13 to be processed with the mail software 2441 of the information processing terminal 240.

In step S31, in the facsimile receiving process, the communication terminal device 210 receives facsimile data through the NCU 116. At this time, the communication terminal device 210 also receives the origination information 510 shown in FIG. 14.

In step S32, when the communication terminal device 210 receives the origination information 510, the origination analyzing unit 2183 analyzes the origination information 510 thus received to obtain the origination telephone number 511, and temporarily stores the origination telephone number 511 in the RAM 217. Then, the origination analyzing unit 2183 notifies the registration information analyzing unit 2184 that the origination analyzing unit 2183 obtains the origination telephone number 511.

In step S33, when the registration information analyzing unit 2184 receives the notification from the origination analyzing unit 2183, the registration information analyzing unit 2184 retrieves the origination telephone number 511 from the RAM 217. Then, the registration information analyzing unit 2184 refers to the destination information 310 stored in the registration information storage region 2181 according to the origination telephone number 511 thud obtained, so that the registration information analyzing unit 2184 determines whether the destination information corresponding to the origination telephone number 511 is already stored in the registration information storage region 2181.

When the registration information analyzing unit 2184 determines that the destination information corresponding to the origination telephone number 511 is already stored in the registration information storage region 2181 (step S33, Yes), the CPU 211 completes a series of processes. When the registration information analyzing unit 2184 determines that the destination information corresponding to the origination telephone number 511 is not stored in the registration information storage region 2181 (step S33, No), the registration information analyzing unit 2184 notifies the telephone book searching unit 2185 that the destination information corresponding to the origination telephone number 511 is not stored in the registration information storage region 2181.

When the telephone book searching unit 2185 receives the notification from the registration information analyzing unit 2184, the telephone book searching unit 2185 instructs the communication control unit 219 to obtain the telephone book information disclosed and provided publicly with the Web server 230. Upon receiving the instruction, the communication control unit 219 is connected to the Web server 230 through the network 200 and the network 220, so that the communication control unit 219 obtains the telephone book information, and temporarily stores the telephone book information in the RAM 217 as the destination registration information 610.

In step S34, the telephone book searching unit 2185 refers to the telephone book information retrieved from the RAM 217 according to the origination telephone number 511. In step S35, the telephone book searching unit 2185 determines whether a telephone number corresponding to the origination telephone number 511 exists in the destination registration information 610. When the telephone book searching unit 2185 determines that the telephone number corresponding to the origination telephone number 511 exists in the destination registration information 610 (step S35, Yes), the telephone book searching unit 2185 notifies the destination information analyzing unit 2186 that the telephone number corresponding to the origination telephone number 511 exists in the destination registration information 610. When the telephone book searching unit 2185 determines that the telephone number corresponding to the origination telephone number 511 does not exist in the destination registration information 610 (step S35, No), the telephone book searching unit 2185 notifies the notification processing unit 21812 that the telephone number corresponding to the origination telephone number 511 does not exist in the destination registration information 610.

In step S36, when the destination information analyzing unit 2186 receives the notification from the telephone book searching unit 2185, the destination information analyzing unit 2186 retrieves the destination information from the destination registration information 610 shown in FIG. 15 necessary for updating the destination information 310 retained in the communication terminal device 210 from the telephone book information corresponding to the telephone number corresponding to the origination telephone number 511. Then, the destination information analyzing unit 1186 temporarily stores the destination information thus retrieved in the RAM 217. Afterward, the destination information analyzing unit 2186 notifies the registration determining unit 2187 that the destination information analyzing unit 2186 retrieves the destination registration information 610.

In step S37, when the registration determining unit 2187 receives the notification from the destination information analyzing unit 2186, the registration determining unit 2187 obtains the destination registration information 610 from the RAM 217. Then, the registration determining unit 2187 refers to the registration condition parameter of the registration condition information 410 stored in the registration condition storage region 2182 with respect to the destination registration information 610 thus retrieved, so that the registration determining unit 2187 determines whether it is possible to store the contents of the destination registration information 610 in the registration information storage region 2181 as the destination information.

When the registration determining unit 1187 determines that it is not possible to store the contents of the destination registration information 610 in the registration information storage region 1181 as the destination information (step S37, No), the destination information analyzing unit 2186 notifies the registration determining unit 2187 that it is not possible to store the contents of the destination registration information 610 in the registration information storage region 1181 as the destination information. More specifically, when any one of the keywords of "Corp.", "Corporation", "LLC", and "Limited Liability Company" is not contained in the name 612 of the destination registration information 610, or the origination telephone number is the origination telephone number 511 shown in FIG. 14, the destination information analyzing unit 2186 notifies the registration determining unit 2187 that it is not possible to store the contents of the destination registration information 610 in the registration information storage region 1181 as the destination information.

When the registration determining unit 2187 determines that it is possible to store the contents of the destination registration information 610 in the registration information storage region 2181 as the destination information (step S37, Yes), the registration determining unit 2187 notifies the mail receiving unit 21813 that it is possible to store the contents of the destination registration information 610 in the registration information storage region 2181. More specifically, when at least one of the keywords of "Corp.", "Corporation", "LLC", and "Limited Liability Company" is contained in the name 612 of the destination registration information 610, or the origination telephone number is the same as the origination telephone number 501 shown in FIG. 4, the registration determining unit 2187 notifies the mail receiving unit 21813 that it is possible to store the contents of the destination registration information 610 in the registration information storage region 2181.

For example, when the telephone book searching unit 2185 determines that the telephone number corresponding to the origination telephone number 511 does not exist in the telephone book information (step S35, No), or the registration determining unit 1187 determines that it is not possible to store the contents of the destination registration information 610 in the registration information storage region 1181 as the destination information (step S37, No), the notification processing unit 21812 creates the electric mail with the main text contents shown in FIG. 16 to be transmitted to the electric mail address 801 as the destination.

In step S41, in a notification process, the notification processing unit 21812 controls the mail server 250 to transmit the electric mail through the communication control unit 219. In step S42, the notification processing unit 21812 stores the origination information 900 of the destination registration information 610 in the stored information storage region 2189. In step S43, it is determined whether the electric mail thus received exists in the mail server 250. When it is determined that the electric mail thus received exists in the mail server 250 (in step S43, Yes), the process proceeds to step S40. When it is determined that the electric mail thus received does not exist in the mail server 250 (in step S38, No), the CPU 211 completes a series of processes.

When the information processing terminal 240 receives the electric mail with the mail software 2441 in step S41, the user of the information processing terminal 240 returns the electric mail with a history according to an instruction of the mail text of the electric mail when it is necessary to store the origination information in the communication terminal device 210. When it is not necessary to store the origination information in the communication terminal device 210, the user do nothing according to own judgment.

After step S37, the mail receiving unit 21813 receives the electric mail from the mail server 250 through the communication control unit 219. In step S38, it is determined whether the electric mail thus received exists in the mail server 250. In step S39, when it is determined that the electric mail thus received exists in the mail server 250 (in step S38, Yes), the mail receiving unit 21813 stores the electric mail thus received in the mail storage region 21811. When it is determined that the electric mail thus received does not exist in the mail server 250 (in step S38, No), the mail receiving unit 21813 notifies the destination registration unit 2188 that the electric mail thus received does not exist in the mail server 250.

When the mail receiving unit 21813 stores the electric mail thus received in the mail storage region 21811 in step S39, the notification analyzing unit 21814 retrieves the electric mail from the mail storage region 21811, so that the notification analyzing unit 21814 retrieves origination information 900 shown in FIG. 18 from the main text contents of the electric mail. FIG. 18 is a schematic view showing the origination information 900 of the communication terminal device 210 according to the third embodiment of the present invention. Then, the notification analyzing unit 21814 adds the origination information 900 to the contents of the destination registration information 610, and notifies the destination registration unit 2188 that the origination information 900 is added to the contents of the destination registration information 610.

FIG. 19 is a schematic view showing destination information 320 of the communication terminal device according to the third embodiment of the present invention.

In step S40, when the destination registration unit 2188 receives the notification from the mail receiving unit 21813 or the notification analyzing unit 21814, the destination registration unit 2188 stores contents of the destination information 320 shown in FIG. 19 in the registration information storage region 2181 according to the notification from the mail receiving unit 21813 or the notification analyzing unit 21814. Then, the CPU 111 completes a series of processes.

As described above, in the third embodiment, in addition to the effect in the first embodiment, even when the destination information related to the origination information satisfying the condition to be stored in the communication terminal device does not exist, it is configured such that the user can decide whether the destination information is stored in the storage unit of the communication terminal device.

In the embodiments described above, the communication terminal device is explained as the device capable of performing the facsimile communication. The present invention is not limited thereto, and may be applicable to a communication terminal device capable of receiving an electric mail.

Further, the present invention is not limited to the facsimile, and may be applicable to a mobile terminal such as a mobile phone.

The disclosure of Japanese Patent Application No. 2009-259021, filed on Nov. 12, 2009, is incorporated in the application.

While the invention has been explained with reference to the specific embodiments of the invention, the explanation is illustrative and the invention is limited only by the appended claims.

What is claimed is:

1. A communication terminal device capable of communicating with en external terminal device and an external information supplying device, comprising:
   a receiving unit for receiving information for identifying origination information from the external terminal device;
   a registration information storage unit for storing a destination of information transmission to the external terminal device as destination information;
   a searching unit for determining whether the information for identifying origination information exists in information in the external information supplying device;
   a destination information analyzing unit for retrieving retrieved information as the information for identifying the origination information from the information in the external information supplying device according to a determination result of the searching unit;
   a destination registration unit for storing the retrieved information in the registration information storage unit according to the determination result of the searching unit;
   a registration condition storage unit for storing a registration condition for determining whether the retrieved information is stored in the registration information storage unit; and
   a registration determining unit for determining whether the retrieved information is stored in the registration information storage unit according to the registration condition,
   said destination registration unit being arranged to store the retrieved information in the registration information storage unit according to the determination result of the searching unit and a determination result of the registration determining unit.

2. The communication terminal device according to claim 1, wherein said destination registration unit is arranged to store the retrieved information in the registration information storage unit when the searching unit determines that the information for identifying origination information is stored in the information in the external information supplying device.

3. The communication terminal device according to claim 1, further comprising a registration information analyzing unit for determining whether information corresponding to the information for identifying origination information exists in the destination information stored in the registration information storage unit, said destination registration unit being arranged to store the retrieved information in the registration information storage unit according to the determination result of the searching unit and a determination result of the registration information analyzing unit.

4. The communication terminal device according to claim 3, wherein said destination registration unit is arranged to store the retrieved information in the registration information storage unit when the registration information analyzing unit determines that the information for identifying origination information is not stored in the registration information storage unit and the searching unit determines that the information for identifying origination information is stored in the information in the external information supplying device.

5. The communication terminal device according to claim 1, wherein said destination registration unit is arranged to store the retrieved information in the registration information storage unit when the searching unit determines that the information for identifying origination information is stored in the information in the external information supplying device and the registration determining unit determines that the registration condition is satisfied.

6. The communication terminal device according to claim 1, further comprising:
   a registration information analyzing unit for determining whether information corresponding to the information for identifying origination information exists in the destination information stored in the registration information storage unit;
   a registration condition storage unit for storing a registration condition for determining whether the retrieved information is stored in the registration information storage unit; and
   a registration determining unit for determining whether the retrieved information is stored in the registration information storage unit according to the registration condition,
   said destination registration unit being arranged to store the retrieved information in the registration information storage unit according to the determination result of the searching unit, a determination result of the registration information analyzing unit, and a determination result of the registration determining unit.

7. The communication terminal device according to claim 1, wherein said destination registration unit is arranged to store the retrieved information in the registration information storage unit when the registration information analyzing unit determines that the origination information is not stored in the registration information storage unit, the searching unit determines that the origination information is stored in the information in the external information supplying device, and the registration determining unit determines that the registration condition is satisfied.

8. The communication terminal device according to claim 1, further comprising a notification destination storage unit for storing notification destination information to be notified to an external information processing terminal device connected to the communication terminal device to be capable of communicating with each other;
   a notification processing unit for transmitting notification information with the retrieved information to a notification destination; and
   a mail receiving unit for obtaining a response of the notification information from the notification destination,
   said destination registration unit being arranged to store the retrieved information in the registration information storage unit according to an analysis result of the response.

9. The communication terminal device according to claim 1, wherein said registration information storage unit is arranged to store the destination information including registration number information, name information, telephone number information, or address information.

10. The communication terminal device according to claim 1, wherein said destination information analyzing unit is arranged to retrieve the retrieved information including telephone number information, name information or address information.

11. The communication terminal device according to claim 1, wherein said communication terminal device is arranged to be capable of communicating with the external information supplying device including a Web server.

12. The communication terminal device according to claim 1, wherein said searching unit includes a telephone book searching unit, said destination information analyzing unit being arranged to retrieve the retrieved information according to a determination result of the telephone book searching unit.

13. A communication terminal device capable of communicating with an external terminal device and an external information supplying device, comprising:
- a receiving unit for receiving information for identifying origination information from the external terminal device;
- a registration information storage unit for storing destination information corresponding to the information for identifying origination information;
- a destination information analyzing unit for determining whether the destination information corresponding to the information for identifying origination information is stored in the registration information storage unit;
- a communication control unit for requesting the external information supplying device to transmit the destination information; and
- a display unit for displaying information,
- wherein said communication control unit is configured to request the external information supplying device to transmit the destination information when the destination information analyzing unit determines that the destination information corresponding to the information for identifying origination information is not stored in the registration information storage unit,
- said communication control unit is configured to receive response information from the external information supplying device relative to transmission request of the destination information,
- said display unit is configured to display the destination information stored in the destination information storage unit when the destination information analyzing unit determines that the destination information is stored in the registration information storage unit, and
- said display unit is configured to display the response information received from the external information supplying device when the destination information analyzing unit determines that the destination information is not stored in the registration information storage unit.

14. The communication terminal device according to claim 13, wherein said display unit is configured to display a screen indicating that the destination information is not included when the response information received from the external information supplying device does not include the destination information.

* * * * *